United States Patent [19]
Bregenzer

[11] 3,769,445
[45] Oct. 30, 1973

[54] GROUND CONDUIT CONSTRUCTION

[76] Inventor: Otto Bregenzer, Gerberstrasse 15a, Saint Gallen, Switzerland

[22] Filed: Feb. 10, 1972

[21] Appl. No.: 225,181

[52] U.S. Cl.................... 174/101, 138/116, 174/49, 174/97
[51] Int. Cl. .......................... H02g 3/04, H02g 3/26
[58] Field of Search.................. 174/48, 49, 68 C, 174/70 C, 72 A, 72 C, 95, 96, 97, 101; 52/221; 138/115, 116, 117; 317/122

[56] References Cited
UNITED STATES PATENTS

| | | | |
|---|---|---|---|
| 1,611,325 | 12/1926 | Tashjian.............................. | 174/49 |
| 3,471,629 | 10/1969 | O'Leary........................ | 174/101 X |

FOREIGN PATENTS OR APPLICATIONS

| | | | |
|---|---|---|---|
| 583,424 | 12/1946 | Great Britain........................ | 174/97 |
| 961,933 | 6/1964 | Great Britain........................ | 174/49 |
| 435,396 | 10/1967 | Switzerland........................ | 174/68 C |

*Primary Examiner*—Laramie E. Askin
*Attorney*—John J. McGlew et al.

[57] ABSTRACT

An apparatus for carrying electrical cables or pipes and electrical connection devices in buildings, comprising a longitudinally elongated continuous duct adapted to be positioned in the ground or foundation and having a generally rectangular U-shaped transverse cross section and an opened top and a removable cover closing said top. The duct has a plurality of longitudinally extending walls dividing the duct into at least one cable compartment extending over the entire length of said duct, and at least one electrical component assembly compartment adjacent to and coextensive in length with said cable compartment and including connection assembly components detachably fixed at selected points along the length of the electrical component compartment. In the preferred arrangement four longitudinally extending compartments are provided which are bounded by walls which extend substantially the complete height or depth of the duct. One of the two adjacent cable compartments, however, is advantageously provided with a wall separating the two adjacent cable compartments which does not extend into the complete height of the duct and which is closed by a separate cover arranged within the duct.

4 Claims, 4 Drawing Figures

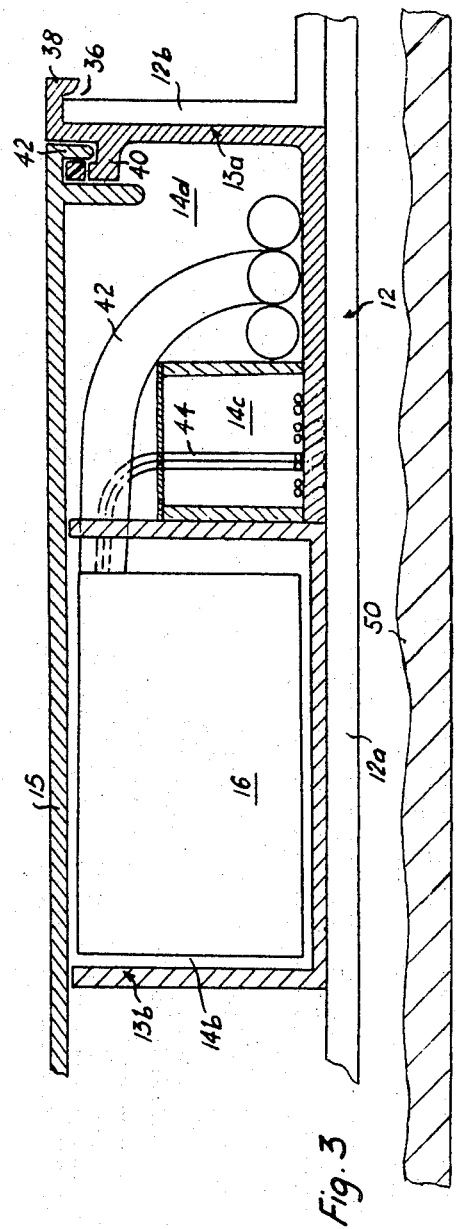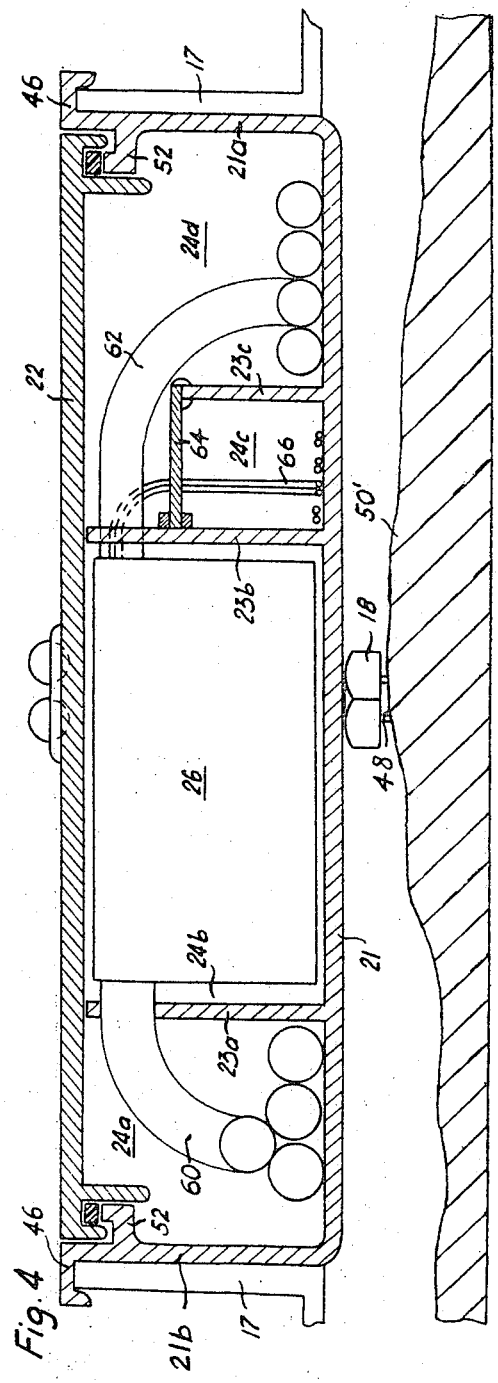

GROUND CONDUIT CONSTRUCTION

BACKGROUND OF THE INVENTION

1. Field of the Invention

This invention relates in general to the construction of carrying ducts for electrical and related equipment and in particular, to a new and useful ground duct for use in buildings having a transverse substantially U-shaped cross section with a plurality of partition walls extending longitudinally along the complete length thereof to divide the duct into a plurality of separate longitudinally extending compartments.

2. Description of the Prior Art

At the present time, it is known to provide ground ducts with cables laid therein which are connected to machines, instruments, telephones, etc., and which include individual electrical component assemblies such as sockets, connection boxes, and similar devices located at selected locations along the length of the duct. Generally, the electrical component assemblies are located at the junctions of the ducts forming the duct network. With the known arrangements, the components require additional exterior space and this makes it possible to effect a change of connections at any point only if an appropriate number of connection assemblies are mounted at the particular location from the start. Such an arrangement incurs considerable expenditure during both the manufacture and the assembly of such devices. Therefore, as a general rule, relatively few points of connections are provided and these have to suffice, which of course necessarily limits the connection possibilities or results in an undesirably long connection cable or cables leading to the devices to be connected.

SUMMARY OF THE INVENTION

In accordance with the present invention, the disadvantages of the prior art are overcome by providing a ground duct which is subdivided by longitudinally extending partition walls to define at least one cable compartment extending along the entire length and with one compartment which is co-extensive with the cable compartment or compartments for the accommodation of connection assemblies, the connection assemblies being detachably fixed at spaced locations along the length of the compartment as desired.

The connection assemblies such as plugs, sockets, junction boxes, etc., may be fixed to the bottom of the duct so that they are accessible from the top after removing a removable cover. In an alternative procedure they may be affixed to the underside of the cover so that they are accessible from below after the cover is removed. The areas of the duct which accommodate connection assemblies may be covered with cover sections containing the bushings for lead-out cables. The partitions between the various compartments may be provided with one or more openings at selected locations along the length in order to facilitate the cross connection of cables which are accommodated in compartments adjacent to the compartment containing the electrical connection assemblies. The compartments are advantageously formed by suitable partitions arranged within the duct cross section but however, they may also be formed by separate ducts firmly ttached to one another along their sides and closed by a single joint cover.

Accordingly, it is an object of the invention to provide an improved ground duct which includes a plurality of side by side longitudinally extending compartments with at least one of the compartments having electrical component assemblies arranged at selected locations along the length thereof and which is adjacent to one or more cable compartments.

A further object of the invention is to provide an electrical ground duct which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWINGS

In the drawings:

FIG. 3 is a partial transverse sectional view of an embodiment of the duct similar to that shown in FIG. 2; and FIG. 4 is a view similar to FIG. 3 of another embodiment of ground duct.

GENERAL DESCRIPTION OF THE PREFERRED EMBODIMENTS

Figure 1:
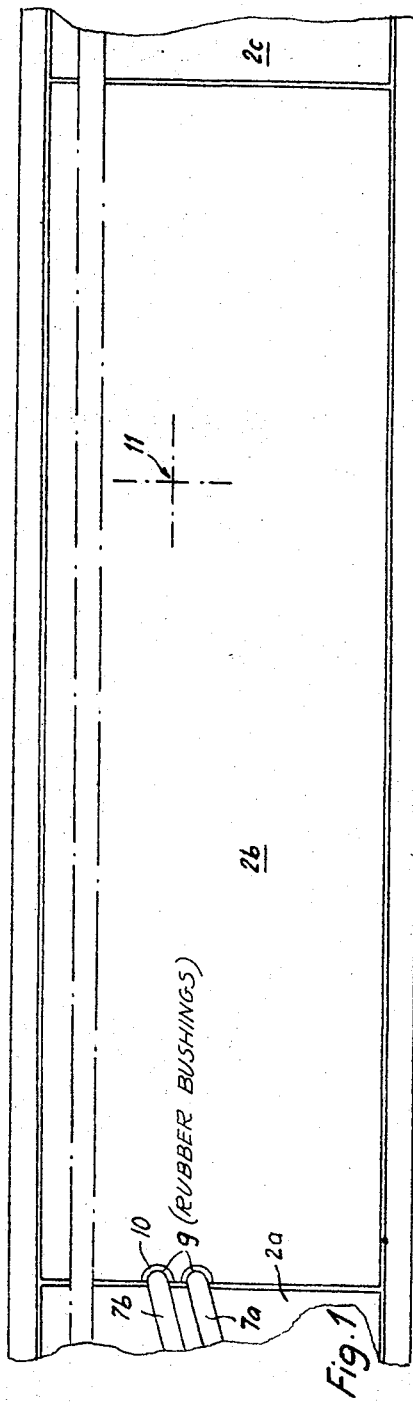
FIG. 1 is a top plan view of a duct for laying cables and pipes in buildings constructed in accordance with the invention.
Figure 2:
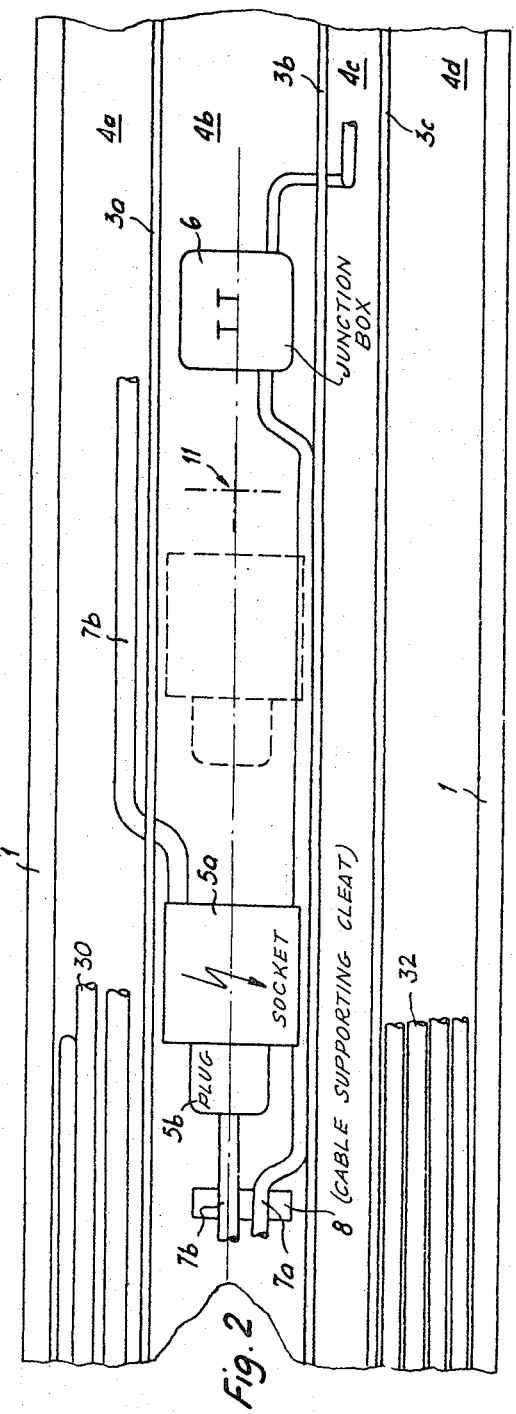
FIG. 2 is a view similar to FIG. 1 but with the top cover removed.

Referring to the drawings in particular, the invention embodied therein, in FIGS. 1 and 2, comprises a ground duct or profile of generally U-shaped rectangular cross section which is made of a material such as a metal or plastic and is generally designated 1.

In accordance with the invention, the interior of the profile 1 is divided by a plurality of longitudinally extending continuous walls or partitions 3a, 3b, 3c. In the embodiment shown in FIGS. 1 and 2, this divides the interior into four compartments 4a, 4b, 4c, and 4d which extend along the complete length of the duct profile 1.

Each partition wall 3a, 3b, 3c rises upwardly from the bottom surface of the U-shaped profile 1 and terminates short of the top edges of each side of the profile to facilitate the enclosure thereof by cover sections 2a, 2b, 2c. In the embodiment shown, the compartments 4a, 4c, and 4d provide a space for accommodating various types of cables, for example, electrical cables, telephone cables, etc. The compartment 4b is provided for building in connection assemblies or compartments which are arranged at selected locations along the length thereof. For example, one such connection assembly is a socket 5a which is spaced longitudinally away from a junction box 6. The connection assemblies such as the sockets 5a and the junction boxes 6 may be built into the compartment 4b at any selected number of locations along the length of the compartment or they may be accommodated on the undersides of the individual cover sections 2a, 2b, 2c, etc. In the latter case, they would overlie for example, the compartment 4b.

In order to facilitate the connection between the cables such as the cables 30 in the compartment 4a or the cables 32 in the compartment 4d or the cables 7a and 7b in compartment 4b with cables or components in another compartment, individual partitions 3a, 3b, and 3c are advantageously provided with openings or holes at relatively small intervals along the length thereof so that the cables may be conducted from one compartment to the other as is the case with the cable 7b which extends from the compartment 4b to the compartment 4a.

In the arrangement shown in FIG. 2, the partition wall 3c is advantageously only made to a partial height and covered on its top by a cover arrangement within the duct profile 1, so that the compartment 4d extends over the top of the compartment 4c. Such an arrangement is desirable when more than one cable compartment is arranged on a side of the connection assembly compartment 4b.

As shown in FIG. 2, the cable 7a is connected with a conventional TT-junction box 6 and cable 7b extends into a plug 5b for connection with the socket 5a. The cables 7a and 7b are supported by a cleat 8 and are provided with rubber bushings 9 as shown in FIG. 1 which extend through openings or recesses 10 defined in an edge of a cover 2b and they are held in position by the adjacent cover 2a. With such an arrangement the cables 7a and 7b are conducted through the duct cover in a manner so that they are resistant to traction. A cover section 2b which has cable bushing recesses is provided only where connection assemblies are built into the compartment 4b. The remaining length of the duct overlying the compartment 4b therefore may be provided with cover sections which do not have any openings 10. The cover sections are advantageously secured in position by a threaded bolt which extends from above and is located for example at the intersection of the center lines as shown at 11 in FIG. 1 and FIG. 2.

Although the ground duct may have only one connection component compartment and one cable compartment, in the usual construction a plurality of compartments is provided for the cables. In the embodiment shown in FIG. 3, the ground duct is formed by a plurality of side by side profile elements, for example, two or more profile elements 13a and 13b of substantially U-shaped transverse cross sections which are arranged in juxtaposition over a horizontal leg portion 12a of a fixed support 12 carried on a foundation wall 50. The fixed support 12 also includes a vertical leg portion 12b which engages into a recess 36 of a hook-shaped extension 38 of the profile 13a. The profile 13a also includes an interior hook-shaped portion 40 which accommodates a down turned flange 42 of a cover 15. The profile 13a defines two cable compartments 14d and 14c which correspond to the compartments 4d and 4c shown in FIG. 2. The profile 13b forms a connection compartment 14b and an additional cable compartment may be defined adjacent this but which is not shown in the drawings. All of the profiles which are arranged in side by side relationship over the horizontal support 12a are covered by a common cover 15. Connection components or assemblies 16 are built into the compartment 14b. All of the compartments extend over the entire length of the ground duct and the walls of the individual profiles are provided with suitable openings to permit the passage of cables therethrough. Cable 42 is shown passing through the wall of the profile 13b into the compartment 14d and cable 44 extends from the connection assembly 16 through the wall of the profile 13b into the compartment 14c. The connection assemblies 16 may be mounted to a support individually or in sets and then the support is affixed to either the bottom of the associated profile or to the underside of the cover. In such an instance, the cable connections must be long enough to permit upward removal of the cover. The cables are connected out of the ground duct through the cover 15 in the manner similar to that shown in FIG. 1.

In the embodiment shown in FIG. 4, a ground duct is formed from a profile member or receiving trough 21 which has end wall portions 21a and 21b with outwardly extending hook formations 46 which engage over angle members 17 at each end which provide fixed supports. Adjustment in respect to the height of the profile 21 may be effected by means of a threaded nut 18 carried on a threaded bolt 48 which is secured in a foundation wall 50'. The end walls 21a and 21b also include inwardly and upwardly extending hook portions 52 which define recesses for receiving the down turned ends of the cover 22. The profile is divided longitudinally along its complete length by longitudinal partition walls 23a and 23b and 23c to form the individual longitudinally extending compartments 24a, 24b, and 24c and 24d which extend over the entire length of the duct and are closed at the top by the joint cover 22. A connection assembly generally designated 26 is built into the connection compartment 24b at selected locations along its length and a cable 60 at one side extends through partition wall 23a into the compartment 24a and a cable 62 at an opposite side extends through the partition wall 23b into the compartment 24d. The compartment 24c is only of partial height and is closed by a small cover 64 and a smaller size cable 66 is carried therein extends through an opening in the cover 64 and through the partition wall 23b for connection to the connection assembly 26.

The ground duct of the invention as described in the various drawings provides a simple design which permits the best use of the available space. It is easy to assemble and permits any desirable interconnection arrangement to be built directly into the duct at any point along its length without making it necessary to provide additional assemblying elements. The arrangement makes it easy to fit additional connection assembly components at selected points along the length of the duct as required for the connection of individual machines, elements, devices, etc. The arrangement makes it possible to provide only those connection assemblies which are absolutely essential since there is always space available for the addition of more components as desired.

While specific embodiments of the invention have been shown and described in detail to illustrate the application of the principles of the invention, it will be understood that the invention may be embodied otherwise without departing from such principles.

What is claimed is:

1. An apparatus for accommodating electrical cables and connecting components in a ground installation for a building, comprising a ground duct having a substantially rectangular U-shaped transverse cross section, at least three laterally spaced longitudinal partition walls extending upwardly from the bottom interior of said duct and extending along the complete length of said duct and dividing the interior of said duct into at least one cable compartment on each side and an intermediate electrical connection component compartment, a plurality of electrical components arranged at selected lengths along the length of said electrical connection component compartment, a partition wall bounding at least one side of said electrical connection compartment having openings arranged at regular spaced intervals for the passage of cables therethrough into an adjacent compartment, at least one of said partition walls being of a height less than the height of said duct, said duct having a wall on each side with an upwardly extending hook-shaped recess, a top cover having a flange on each side engaged into the upwardly extending hook-shaped recess of said duct, said top cover including a plurality of portions of selected longitudinal length which are removable and having means for the passage of a cable therethrough, each of the outer side walls of said duct including an outwardly and downwardly extending hook-shaped top portion, and a vertical support having its top engaged in the underside of said outwardly and downwardly extending hook-shaped top portion to support said duct.

2. An apparatus, according to claim 1, wherein said duct comprises a plurality of individual profile members arranged in side by side juxtaposition and having vertical walls defining respective said partition walls, each profile member defining at least one wall of a separate compartment within the duct.

3. An apparatus, according to claim 1, wherein said duct comprises a single member with integrally formed partition walls.

4. An apparatus, according to claim 1, including adjustable means engaged with the underside of said duct for supporting said duct at a selected height.

* * * * *